Figure 1:
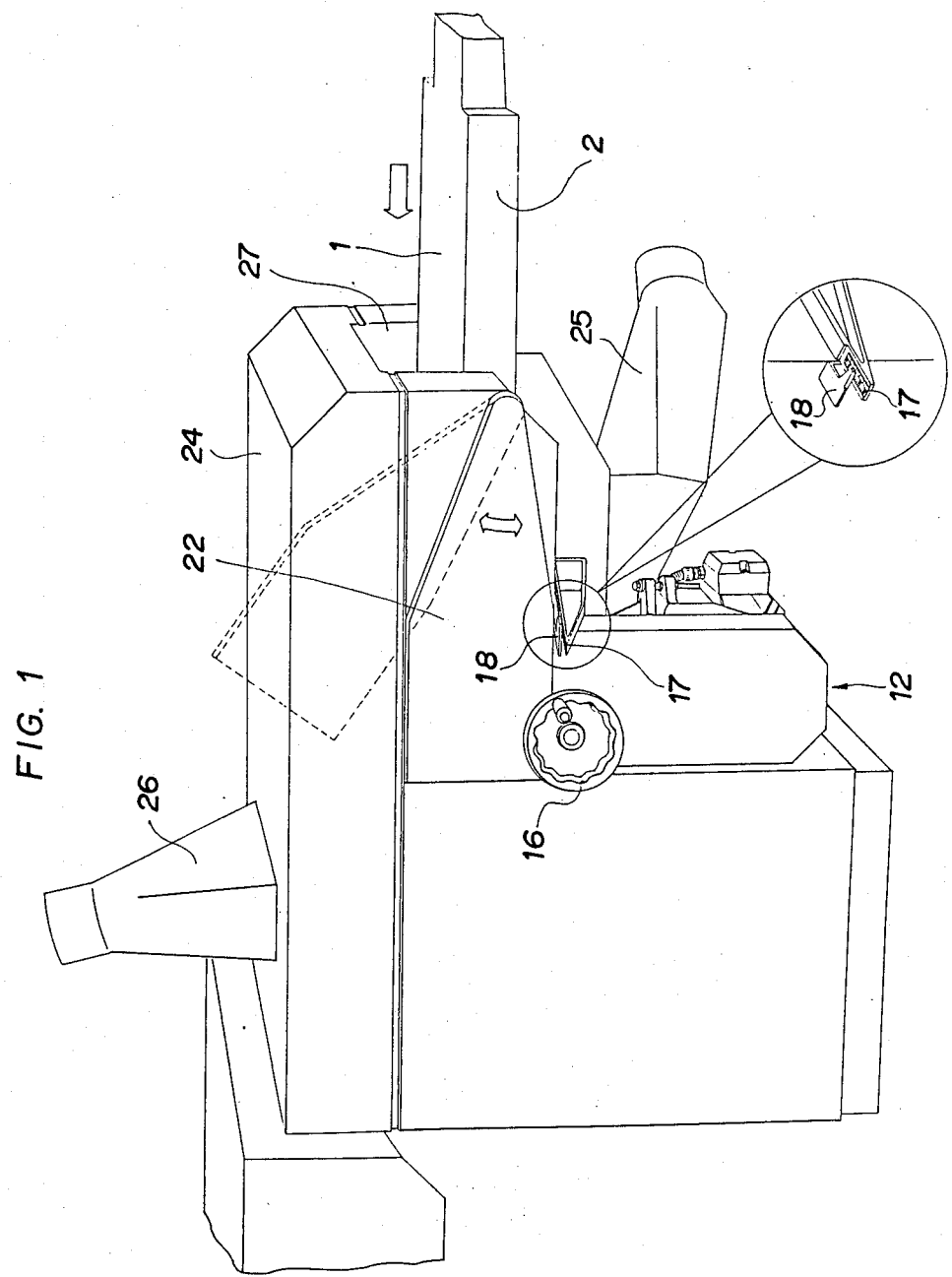

United States Patent [19]

De Abreu

[11] Patent Number: 4,842,029

[45] Date of Patent: Jun. 27, 1989

[54] WOODWORKING MACHINE

[75] Inventor: Alfredo F. De Abreu, Trofa, Portugal

[73] Assignee: Mida-Máquinas Industriais do Ave, Lda., Trofa, Portugal

[21] Appl. No.: 192,830

[22] Filed: May 11, 1988

[30] Foreign Application Priority Data

May 26, 1987 [PT] Portugal ............................ 84951
Nov. 10, 1987 [PT] Portugal ............................ 86105

[51] Int. Cl.$^4$ .............................................. B27C 1/00
[52] U.S. Cl. ................................ 144/117 R; 144/116; 144/131; 144/134 R; 144/136 R
[58] Field of Search ............... 144/114 R, 117 R, 131, 144/134 R, 136 R, 116, 247

[56] References Cited

U.S. PATENT DOCUMENTS

| 385,284 | 6/1888 | Ross | 144/131 |
|---|---|---|---|
| 397,113 | 2/1889 | Doane | 144/131 |
| 403,368 | 5/1889 | Passel | 144/131 |
| 899,143 | 9/1908 | Thomas et al. | 144/247 |
| 2,859,780 | 11/1958 | Carlson | 144/116 |

OTHER PUBLICATIONS

S-382 Double Planer, Newman-Whitney, Newman Machine Company, Inc., undated.

Weinig Tooling & Rondamat 912 Grinder, Provenance unknown, undated.

Primary Examiner—W. Donald Bray
Attorney, Agent, or Firm—Goodman & Teitelbaum

[57] ABSTRACT

A carrier (12) is laterally displaceable on the feed table (2) of the machine on a track (13) slidable in a track bed (11), the lateral position being adjustable by means of an acutating means (16) connected to a spindle. Lower and upper woodworking units (9, 10), each having a tool spindle (3, 5) supported at both ends and tools (4, 6) disposed thereon, e.g., planers, groovers, and/or profile cutters, are removable together with bearing housings (7) after disengaging securing means (21) and replaceable, e.g., by woodworking units equipped with other tools. The tool spindle (3, 5) is separable from the bearing housings (7) for exchanging the tools (4, 6). For ease in removing and replacing the lower woodworking unit (9), the carrier can be pulled completely out of the machine at one side. For adjusting optimum cutting, the lower woodworking unit can be vertically positioned as regards the overhang of the tools relative to the working surface (1) of the feed table. Owing to the easy exchangeability of the woodworking units and the adjustability of the lower woodworking unit, the machine can be used both as a planar and as a combined planing-milling machine.

8 Claims, 8 Drawing Sheets

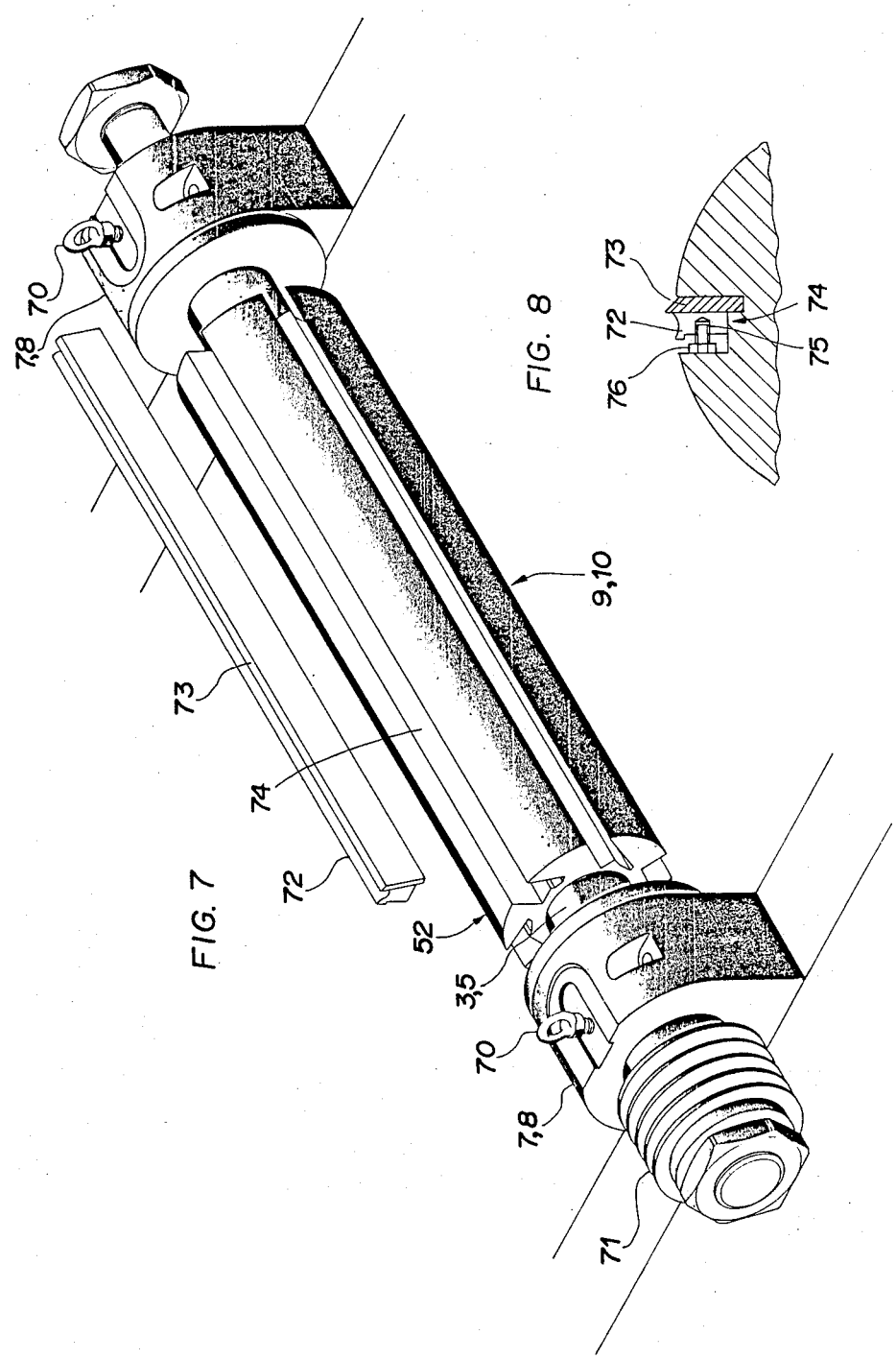

WOODWORKING MACHINE

This invention relates to woodworking machines, and more particularly to a woodworking machine for working at least one side of a workpiece, of the type having a feed table with a working surface, a lower tool spindle for disposing at least one tool projecting from the working surface of the feed table, an upper tool spindle disposed spaced from and parallel to the lower tool spindle for disposing at least one further tool, and bearing means accommodated each in a respective bearing housing for unilaterally supporting the said tool spindles.

The invention further relates to a woodworking unit for use with the foregoing machine, of the type having a tool spindle for bearing tools and a bearing housing disposed at one end of the tool spindle and having means for rotatingly supporting the tool spindle.

In practice it often happens that a workpiece made of wood, e.g., a wooden beam, should be planed on at least side and provided with grooves and/or other depressions having any desired shape, and that edges must be rounded or bevels applied. With the machines usually available at the present, several operations are necessary for that purpose. First the desired sides of the workpiece are planed in a planning machine, then the desired depressions or shapes are applied in one or more operations on a milling machine.

There are also machines which can be used, within limits, as planers and/or profile-cutters. In these machines, the spindles receiving the tools are rotatingly connected at one end to bearing means permanently integrated in the machine frame. A changeover of the tool spindles with planing or profile-cutting tools requires a great deal of mechanical work and extensive downtime for the machine. The expense for adjusting the individual milling tools on the spindles is high, especially when the dimensions or spacing of grooves or shapes on opposite sides must be identical. It is often necessary to unscrew, adjust, and retighten the individual milling tools several times before a faultless section can be ensured. The length of the tool spindles is limited in these machines because of the unilateral bearing support.

For smooth operation of a planer, it is important that the cutting edges of the planing tool project a very specific distance beyond the working surface of the feed table of the machine. If the cutting edges of the planing tool are adjusted too low, the workpiece hits against the chip breaker subsequently mounted on the rotating tool on the feed table. If the cutting edges of the planing tool protrude too far beyond the working surface of the feed table, chips are visible at the end of the workpiece after planing. Newly sharpened planing tools with extremely sharp cutting edges wear out to a certain extent after very brief use. The cutting diameter of the planing tool is thereby reduced. With conventional machines, therefore, it is necessary to halt operation after a very short time in order to readjust the planing tool as regards the distance by which its cutting edges protrude beyond the working surface of the feed table. As wear on the cutting edges increases, this adjustment operation must be repeatedly carried out.

It is an object of this invention to provide a woodworking machine for the planing and profile cutting of workpieces which does not present the drawbacks of prior art machines as regards the number of working operations, the possibility of changing over to other tools, the time and expense necessary for adjusting and conforming dimensions and lateral spacing of grooves or profile cutting on two opposite sides, as well as the possibility of positioning the projection of the cutting edges relative to the working surface of the feed table of the machine.

A further object of this invention is to provide a woodworking machine on which spindle lengths for woodworking widths of up to two meters can be achieved.

To this end, in the woodworking machine according to the present invention, there is a respective bearing housing with bearing means for supporting each of the tool spindles at the other end, each of the tool spindles together with the bearing housings at its two ends forms a respective removable and interchangeable woodworking unit, and at least the lower woodworking unit is laterally displaceable and vertically positionable relative to the working surface.

In the woodworking unit according to the present invention, there is a further bearing housing at the other end of the tool spindle with means for rotatingly supporting the tool spindle for achieving smooth and true rotation with a spindle length of up to two meters, and the tool spindle is separable from the bearing housings for disposing and changing the tools.

Figure 2:
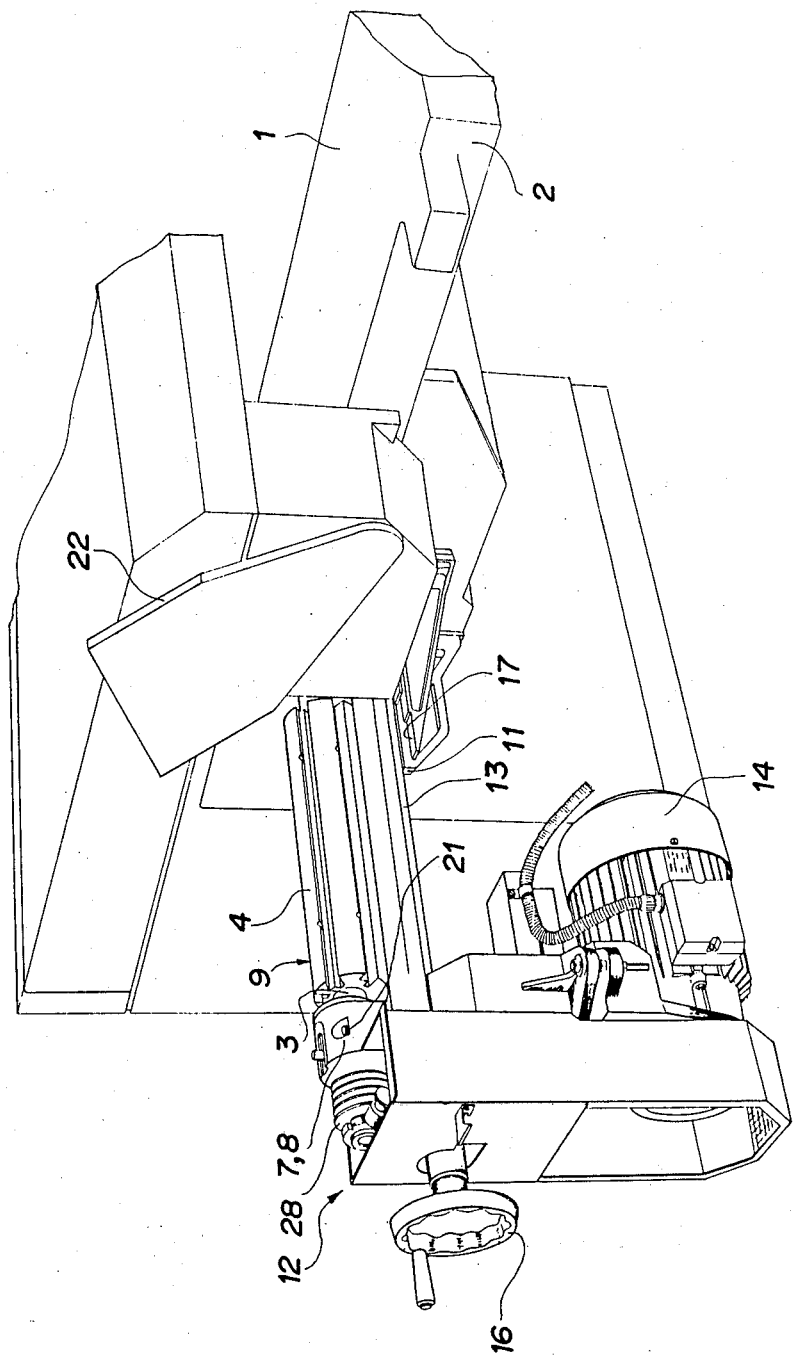
Figure 3:
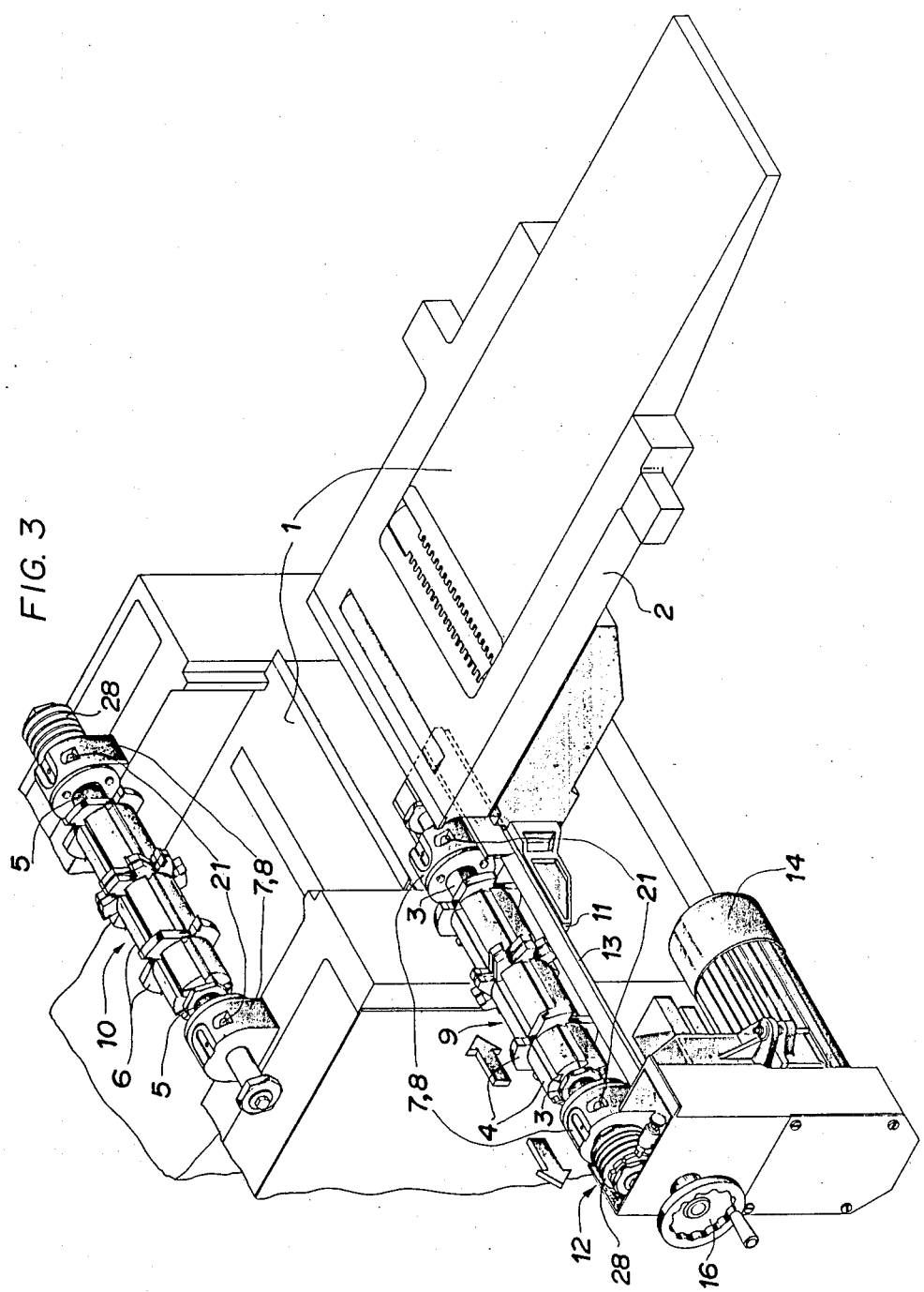
Figure 4:
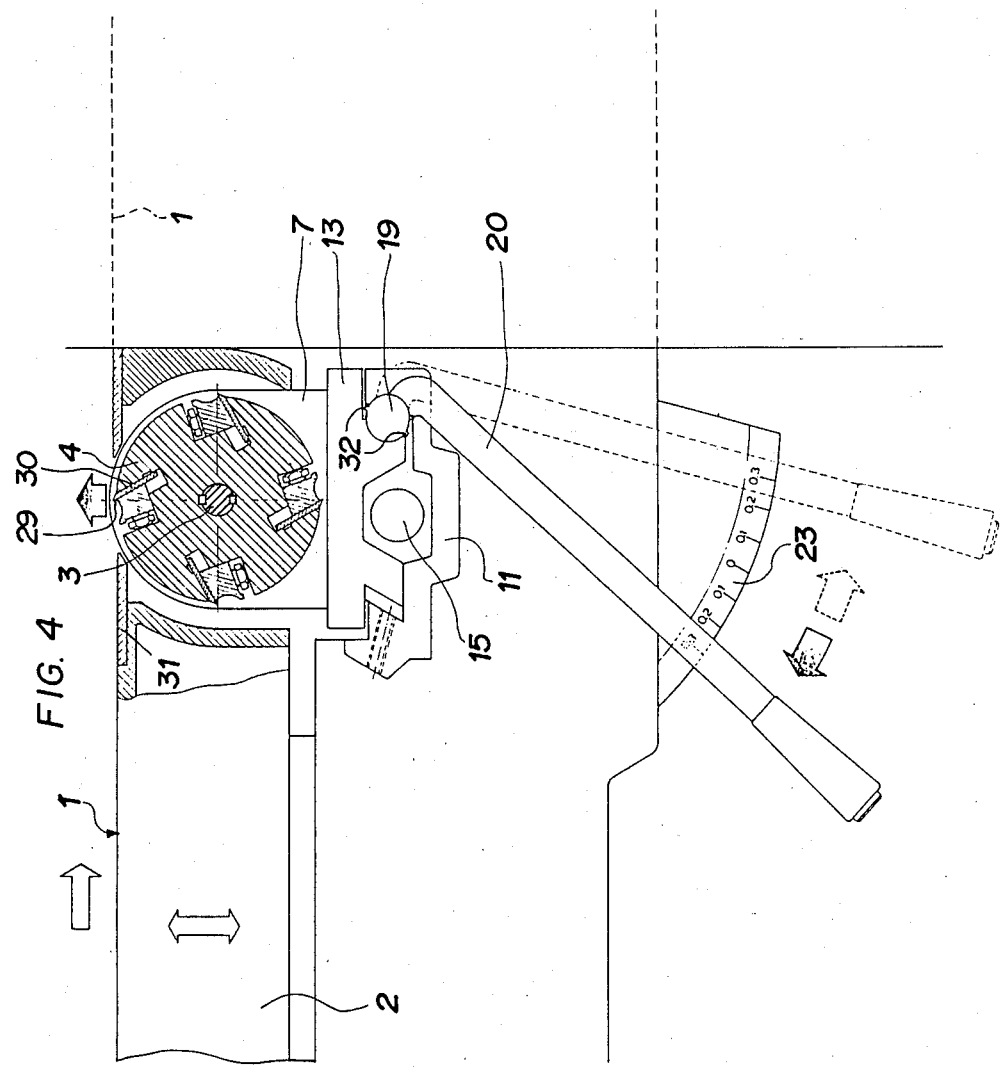
Figure 5:
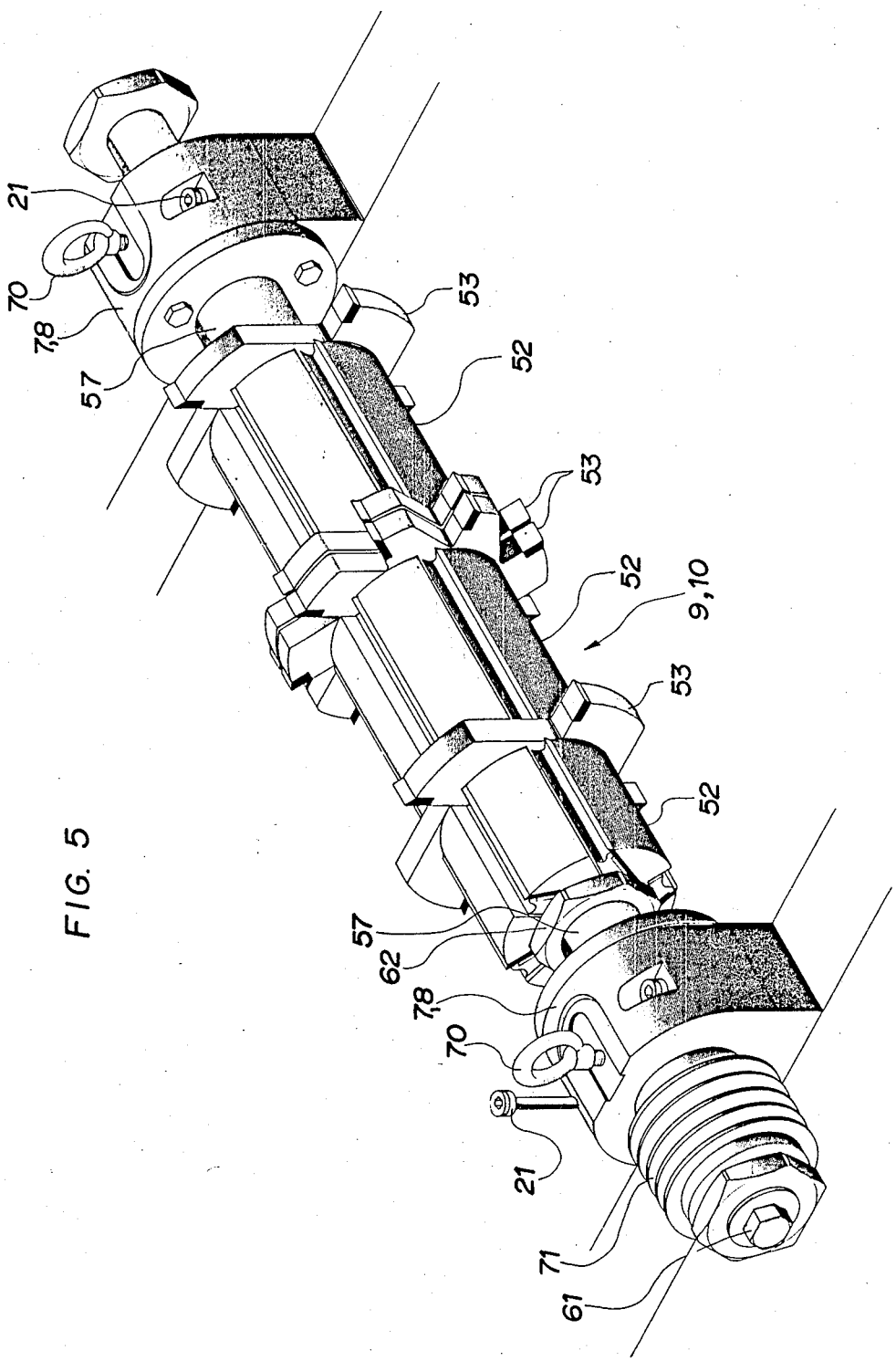

A preferred embodiment of the invention will now be described in detail with reference to the accompanying drawings, in which:

FIG. 1 is a side perspective view of the woodworking machine according to the present invention, FIG. 2 is a perspective view of the machine with the lower woodworking unit completely extended laterally, FIG. 3 is a perspective view of the machine without the upper covering parts, showing the upper woodworking unit and the completely extended lower woodworking unit, FIG. 4 is an elevation of part of the side of the machine opposite the side illustrated in FIG. 1 with the lower woodworking unit shown partially in section, displaying the possibility of vertical positioning of this woodworking unit, FIG. 5 is a perspective view of a woodworking unit for the machine of FIGS. 1-4, FIG. 6 is an exploded view of the woodworking unit of FIG. 5, FIG. 7 is a perspective view of a woodworking unit having a planing tool with interchangeable blades, and FIG. 8 is a partial section through a planing tool according to FIG. 7.

FIGS. 1-4 illustrate an embodiment of a woodworking machine according to the invention for planing and/or profile-cutting workpieces, especially of wood or plastics. The side view of FIG. 1 shows the machine in operating state. A cover 24 covers an upper woodworking unit 10 (FIG. 3) having tools for planing and/or milling; a protective cover 22, in the lowered position shown in solid lines, protects the operator from debris produced during operation of a lower woodworking unit 9 (FIG. 2) likewise having tools for planing and/or milling. The machine makes it possible at least to plane simultaneously the top and bottom faces of a workpiece placed on a working surface 1 of a feed table 2 and inserted in an opening 27 in the direction indicated by the arrow, or to plane the mentioned faces of the workpiece and simultaneously to apply profile cuts such as grooves, roundings, bevels, etc. The material removed from the bottom face of the workpiece is ejected through a chip-disposal duct 25, and the material removed from the top of the workpiece is ejected through a chip-disposal duct 26. Provision is made for machines of the same construction by means of which two, three, or four faces of a workpiece can be worked simultaneously. The protective cover 22 may be swung up into the position shown in dashed lines.

FIG. 2 shows the machine with the cover 22 swung up and the lower woodworking unit 9 mounted on a carrier 12. As will be described below, the carrier 12 can be slid laterally out of the machine for ease in changing the woodworking unit 9.

FIG. 3 shows the woodworking machine with the covers 22 and 24 removed, so that the lower woodworking unit 9 and the upper woodworking unit 10 are visible. There are a number of tools 4, 6, particularly for planing and groove cutting of workpieces, on both a tool spindle 3 of the lower woodworking unit 9 and on a tool spindle 5 of the upper woodworking unit 10. The ends of tool spindles 3, 5 are connected to bearing means 8 which are rotatingly supported in respective bearing housings 7 disposed on each side of each spindle. The upper woodworking unit 10 is connected to the machine by means of securing means 21, e.g., screws. The lower woodworking unit 9 is mounted by means of the same securing means 21 on a track 13 of carrier 12. Owing to this structural feature, both the lower unit 9 and the upper unit 10 can be removed by unfastening the securing means 21 and replaced, e.g., by woodworking units prepared with other or differently disposed tools 4, 6. A woodworking unit equipped only with a planer is depicted in FIG. 7, for example. The simple and rapid interchangeability of the woodworking units 9, 10 is one of the essential advantages of the invention. Another advantage is that various kinds of tools 4, 6, such as planers, groovers, profile cutters, etc., may be disposed on the tool spindles 3, 5. This represents a saving on operations, for workpieces can be planed and provided with grooves and/or bevels, etc., in one operation.

A track bed 11 is disposed at right angles to the feed table 2. The track 13 attached to the carrier 12 is slidingly mounted on the bed 11 in a manner known per se. Rotatingly disposed between the track bed 11 and the track 13 is a spindle 15 connected at one end to an actuating means 16 projecting from carrier 12. In the embodiment illustrated, a handwheel is provided as the actuating means 16. By turning the handwheel clockwise or counterclockwise, the carrier 12 with the track 13 in the track bed 11 can be moved laterally in either direction. As already stated, the carrier 12 can be run out completely to one side for replacing lower woodworking unit 9. This possibility of displacing the lower woodworking unit laterally yields another great advantage of the invention. It often happens during woodworking operations, for instance, that grooves having to be milled on the top and bottom faces of a workpiece must agree as to their lateral positioning. By means of actuating means 16, the lateral position of the tools 4 of lower unit 9 can easily be brought into agreement with the lateral position of the tools 6 of the upper unit 10. Time-consuming adjustment operations for disassembling, removing, moving, and re-assembling individual tools are not necessary with the machine according to the present invention. A graduated scale 17 is connected to the feed table 2 and projects from the side of the machine where the actuating means 16 is situated. An indicator connected to the carrier 12 indicates on the scale 17 the lateral position of the lower woodworking unit 9 relative to the feed table 2. After the working of an individual workpiece, any lateral deviation of the dimensions can be measured and corrected by means of the handwheel 16. The magnitude of the correction can be read on the scale 17.

The woodworking units 9 and 10 are driven by separate drive means. The drive means 14 for the lower woodworking unit 9 is connected to the carrier 12 (the drive means for the upper woodworking unit 10 is not shown). Bearing means 8 for each of the units 9 and 10 each comprise a pulley 28 on the side of the respective bearing housing 7 remote from the woodworking unit. V-belts (not shown) connect the pulley 28 for driving the respective woodworking unit 9, 10 to the associated drive means.

The lower woodworking unit 9 is disposed spaced from and parallel to the upper woodworking unit 10. The feed table 2 with the carrier 12 is vertically displaceable by means not shown so that the vertical spacing between the woodworking units 9 and 10, hence the thickness of the piece to be worked, can be adjusted.

When the carrier 12 is pushed in, the cutting edges 29 of knives 30 of planers 4 disposed on the tool spindle 3 protrude slightly beyond the working surface 1 of the feed table 2, as may be seen in FIG. 4. The precise amount of such protrusion, or overhang, is extremely important for proper planing. Freshly sharpened knives 30 wear down slightly after very brief use. This reduces the outside diameter of the planer 4 and the overhang relative to the working surface 1. The consequence is difficulty in planing in that the workpiece will hit against a chip breaker 31, and the overhang must be corrected. if the overhang is too great, chips break out at the end of a planed workpiece. The present invention adroitly solves the problem of adjusting the overhang: between the track bed 11 attached to the feed table 2 and the track bearing the woodworking unit 9 there is an eccentric shaft 19 which lifts the track 13 slightly off the bed 11 by rotation. The vertical position of the planer 4 relative to the surface 1 of table 2 can thereby be varied. The range of adjustment is only a few hundredths of a millimeter. In the embodiment illustrated in FIG. 4, the eccentric shaft 19 has two cams 32 opposite one another. Disposed at one end of the shaft 19 and at right angles thereto is a lever 20 for rotating the shaft. The relative adjustment of the overhang of planer 4 can be read on a second graduated scale 23 over which the lever 20 passes when it is set. The two end positions of this lever are shown in FIG. 4 in solid lines, representing the smallest overhang, and in dashed lines, representing the greatest overhang. The overhang may be set during operation of the machine. As a further advantage of the invention, this possibility of vertically positioning the lower woodworking unit 9 does away with repeated machine downtimes for re-adjusting the overhand. Inasmuch as the overhang is always optimally adjusted, the tools have a longer service life than with prior art machines. A possibility of vertical positioning is not expedient for the upper woodworking unit 10 because the conditions are different than owing to the absence of a working surface.

Figure 6:
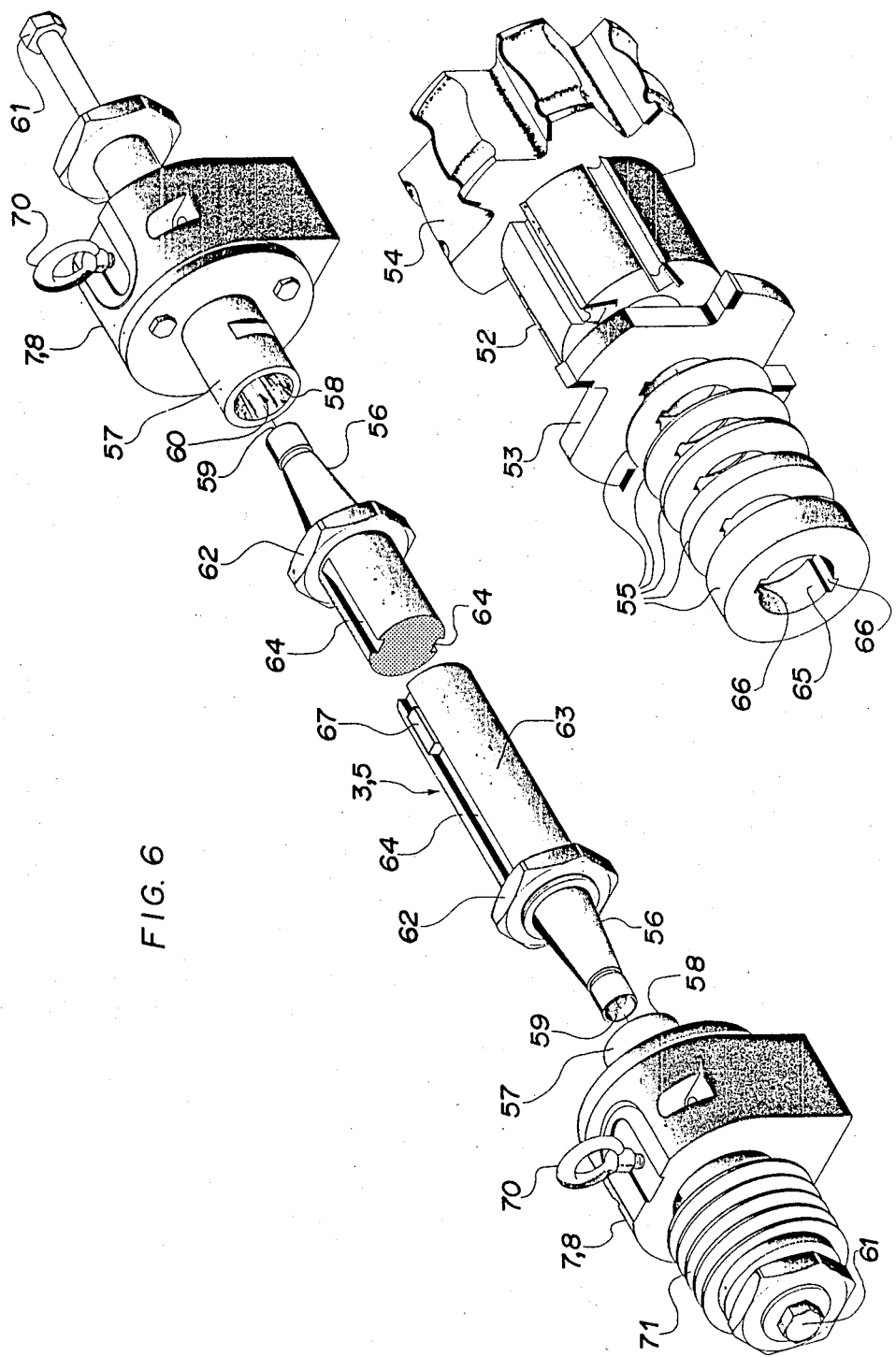

One of the woodworking units 9, 10 will now be described in more detail with reference to FIGS. 5 and 6. As already stated, the woodworking unit is notable in that it can be removed from the machine and replaced as a whole by unfastening the securing means 21. The woodworking unit 9 or 10 comprises essentially a tool spindle 3, 5 bearing tools 52, 53, 54, 55, as well as two bearing housings 7, each provided with bearing means 8 for rotatingly mounting the tool spindles 3, 5. The individual tools, especially planers 52, groovers 53, profile cutter 54, and/or separators 55, can be disposed on the tool spindles 3, 5 in any desired combination and number. One advantageous feature of the woodworking unit 9, 10 for the woodworking machine is that not only is the former interchangeable as a whole, but the tools 52-55 on the tool spindles 3, 5 can also be interchanged and/or rearranged in an extremely simple manner. For that purpose, the tool spindles 3, 5 are made removable from the bearing housings 7. At each end of the tool spindles 3, 5 there is a cone 56. On the sides of the bearing housings 7 nearest the tool spindles 3, 5, the bearing means 8 are each provided with a pivoted journal 57, each of which has an inner cone 58. These journals 57 are coaxial, and the inner cones 58 can be connected to the conical ends 56 of the tool spindles 3, 5, in order to secure the latter, by pushing the bearing housings 7 together. In the center of each of the conical ends 56 there is a blind hole 59 having an internal thread, while the journals 57 projecting from the bearing housings 7 each have a continuous concentric bore 60. Fastening means 61, which take the form of hexagon head screws, pass through the bores 60 and engage the aforementioned internal threads to fix the tool spindles 3, 5. The individual tools 52, 53, 54, 55 intended to be disposed on the tool spindles 3, 5 each have a central bore 65 with two opposing grooves 66. Between the conical ends 56 of the tool spindles 3, 5 there is a cylindrical portion 63 having two opposing grooves 64 extending over substantially its entire length. The central bores 65 of the tools 52-55 are slipped over the cylindrical portion 63 and aligned so that one of the grooves 66 of each tool 52-55 coincides with one of the grooves 64 of the tool spindles 3, 5. A key 67 is disposed in the keyway 66, 64 thus formed as a driver for each of the slipped-on tools 52-55. Each of the bearing housings 7 has an eyebolt 70 for use in raising or lowering the woodworking unit 9, 10 relative to its base support. On one of the bearing housings 7, on the side remote from the tool spindles 3, 5, a pulley 71 is connected to the bearing means 8.

Provision is made for equipped frequently used woodworking units without a removable tool spindle. An example of a woodworking unit 9, 10 having a planar 52 extending over the whole working width is shown in FIG. 7. In this case, the total spindle 3, 5 and the planar 52 are preferably made in one piece. In the planar 52, individual knives 73 are replaceably inserted by means of clamping means 72 in grooves 74 distributed over the circumference of the tool. FIG. 8 shows an example of a means for securing the knives 73 in a groove 74. The clamping means 72 has threaded holes 75 at regular intervals. After the knife 73 and the clamping means 72 have been inserted in the groove 74, hexagon head screws 76 can be screwed out of the holes 75 to press the knife 73 and the head of the screw 76 against opposite sides of the groove 74.

Through the arrangement of precise and well-balanced tools 52, 53, 54 on the solidly produced and bilaterally mounted tool spindles 3, 5, the woodworking unit 9, 10 is capable, when used on appropriate machines, of ensuring excellent surface quality of the pieces worked. It has been shown that the rate of travel of the workpieces is increased from 10-20 m/min. with conventionally equipped machines to over 60 m/min. on machines equipped with the woodworking unit according to the present invention. The tool spindles of these woodworking units, supported at both ends and up to 2 m. in length, make it possible to work very wide pieces on suitable machines.

What is claimed is:

1. A woodworking machine for working at least one side of a workpiece, of a type having a feed table including a working surface, a lower tool spindle for disposing at least one tool projecting from the working surface of the feed table, an upper tool spindle disposed spaced from and parallel to the lower tool spindle for carrying at least one further tool, and bearing means accommodated in each of two bearing housings for supporting each of the tool spindles at one end thereof, wherein the improvement comprises:

two further bearing housings;
further bearing means accommodated in each of said two further bearing housings for supporting each of said tool spindles at the other end thereof;
a removable and interchangeable lower woodworking unit formed by said lower tool spindle and two associated ones of said bearing housings;
a removable and interchangeable upper woodworking unit formed by said upper tool spindle and two other associated ones of said bearing housings;
means for displacing at least said lower woodworking unit laterally;
means for positioning at least said lower woodworking unit vertically relative to said working surface;
a track bed disposed on said feed table at right angles thereto;
carrier means including a track disposed slidingly in said track bed;
means for connecting said lower woodworking unit to said track so that said lower woodworking unit is laterally withdrawable from said machine;
drive means secured to said carrier means for driving said lower woodworking unit;
a third spindle disposed between said track and said track bed;
actuating means situated at one end of said third spindle for laterally displacing said lower tool spindle relative to said upper tool spindle;
a graduated scale attached to said machine;
indicator means disposed on said carrier means for reading a lateral position of said lower tool spindle on said scale;
an eccentric shaft disposed between said track and said track bed; and
a lever connected at right angles to one end of said shaft so that a spacing of said track from said track bed is variable by a few hundredths of a millimeter for vertically positioning said lower woodworking unit relative to said working surface.

2. A woodworking unit for use with a woodworking machine, of a type having a tool spindle for carrying tools, a bearing housing disposed at one end of the tool spindle, and means accommodated in the bearing housing for rotatingly supporting the tool spindle, wherein the improvement comprises:

a further bearing housing disposed at the other end of said tool spindle;
further means accommodated in said further bearing housing for rotatingly supporting said tool spindle for achieving smooth and true rotation with a spindle length of up to two meters;

means for detachably connecting said tool spindle to said bearing housings for carrying and changing said tools;

said tool spindle including two conical end portions;

said two bearing housings including, projecting from mutually facing sides thereof, two respective journals disposed on a straight line and each having an inner core matching one of said conical end portions;

each of said conical end portions including at a center thereof a blind hole having an internal thread;

each of said journals including a continuous concentric bore; and fastening means passing through each said bore and engaging said internal thread.

3. The woodworking unit of claim 2, further comprising means disposed on said tool spindle for clamping and fixing at least one interchangeable tool.

4. The woodworking unit of claim 3, wherein said tool spindle comprises a cylindrical portion disposed between said conical end portions and including at least one first groove extending over a length of said cylindrical portion, and wherein said interchangeable tool comprises a central bore including at least one continuous second groove, further comprising a key for insertion in said first and second grooves when aligned for fixing said interchangeable tool.

5. The woodworking unit of claim 4, wherein said interchangeable tool is a planer.

6. The woodworking unit of claim 4, wherein said interchangeable tool is a groover.

7. The woodworking unit of claim 4, wherein said interchangeable tool is a profile cutter.

8. The woodworking unit of claim 2, comprising a plurality of interchangeable tools disposed in any desired combination on said tool spindle.

* * * * *